May 12, 1925.
H. F. CLARK
1,537,462
COOLING HOLLOW GLASS ARTICLES DURING DRAWING
Filed June 8, 1921   2 Sheets-Sheet 2
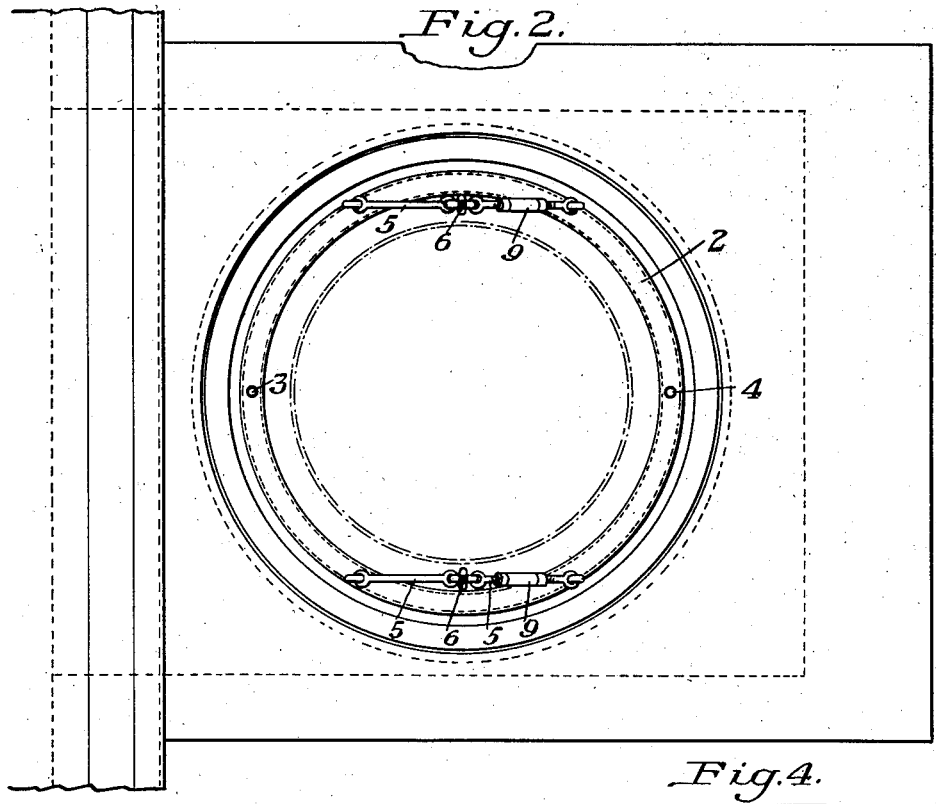
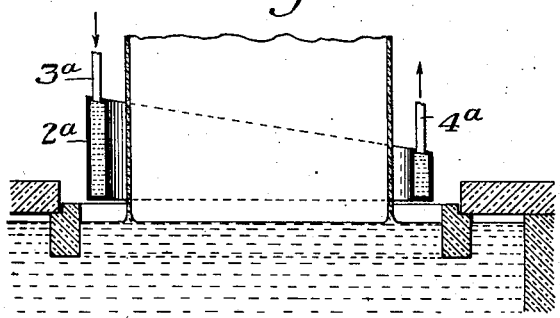
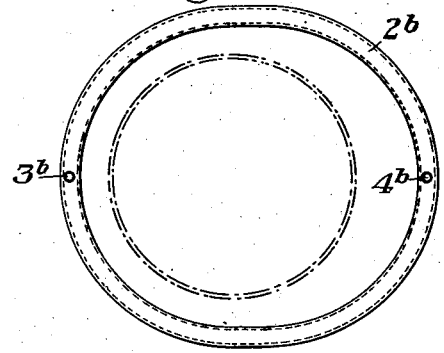
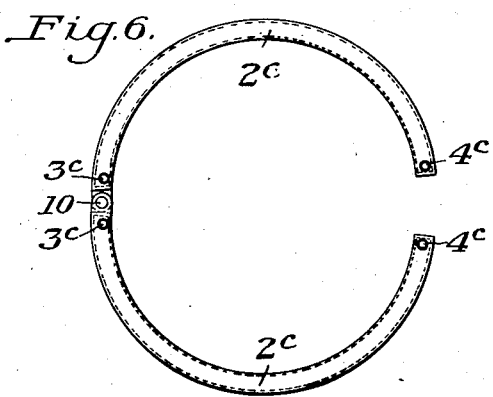
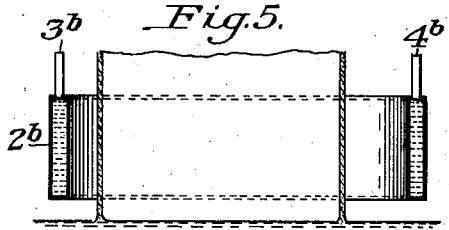

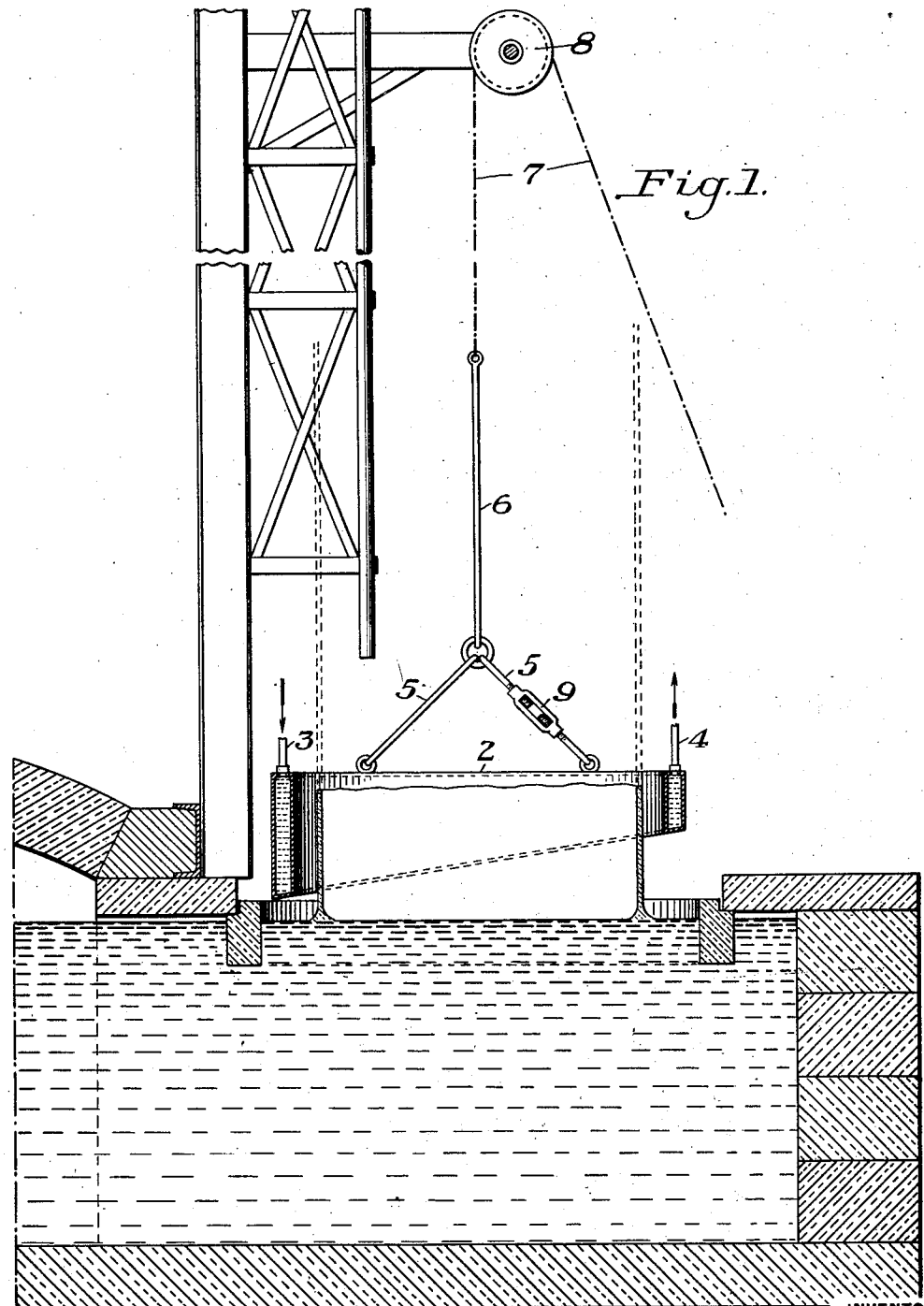

Patented May 12, 1925.

1,537,462

UNITED STATES PATENT OFFICE.

HENRY F. CLARK, OF OAKMONT, PENNSYLVANIA, ASSIGNOR TO WINDOW GLASS MACHINE COMPANY, OF PITTSBURGH, PENNSYLVANIA, A CORPORATION OF NEW JERSEY.

COOLING HOLLOW GLASS ARTICLES DURING DRAWING.

Application filed June 8, 1921. Serial No. 476,052.

*To all whom it may concern:*

Be it known that I, HENRY F. CLARK, a citizen of the United States, residing at Oakmont, in the county of Allegheny and State of Pennsylvania, have invented a new and useful Improvement in Cooling Hollow Glass Articles During Drawing, of which the following is a full, clear, and exact description, reference being had to the accompanying drawings, forming part of this specification, in which—

Figure 1 is a vertical section showing a portion of the forehearth provided in my improved radiation cooling device;

Figure 2 is a plan view of the same;

Figure 3 is a view similar to Figure 1 showing the ring in inverted position;

Figure 4 is a plan view of a modified form of cooler;

Figure 5 is a vertical section of the ring of Figure 4, and

Figure 6 is a plan view showing another form of cooling device within my invention.

My invention relates to the drawing of glass cylinders, or other hollow glass articles, from a bath of glass, and particularly from a forehearth or portion of a tank in which the temperature conditions differ in different portions. In forehearth drawing the temperature of the glass bath and the temperature of the air above the bath is usually hotter on the tank side of the forehearth than on the opposite or outer side. This tends to form "thick-and-thin" glass in the cylinder. My invention is designed to overcome or reduce this trouble and consists in cooling the glass either in the bath or in the rising cylinder, or in both, to different degrees or amounts in different portions around the rising cylinder.

In the form shown in Figures 1 and 2 the radiation cooling ring 2 consists of a hollow water-cooled ring of the usual annular form, except that the ring is made gradually deeper toward one side, as plainly shown in Figure 1. In this construction the cross-section is gradually varied to vary the cooling effect both on the bath and on the walls of the rising cylinder. As shown, the deepest side of the cooling ring through which water is circulated is on the tank side of the draw. Furthermore, in the form shown in these figures the ring is nearest to the surface of the glass bath on the tank side, thus exerting a stronger cooling influence on that portion of the bath toward the tank. With this preferred form, therefore, there is a greater chilling effect both on the bath and on the rising cylinder on the tank side, this cooling effect being gradually increased from the outside of the forehearth toward the tank side and all around the cylinder. 3 and 4 are the inlet and outlet water pipes for circulating water through the ring. These may be connected in any desirable manner to a suitable source of supply and exhaust.

I have shown the cooling ring as supported upon links 5, 5, carried by a link 6 supported by a chain or wire rope 7 extending over a sidewise adjustable pulley 8. The ring may thus be raised or lowered slightly, may be tilted by operating the turn buckle 9 in one or more of the supporting links, and may be shifted sidewise slightly either by shifting the pulley on its shaft, or by slight sidewise shifting of the shaft itself.

In Figure 3 I show a form of ring 2ª, similar to that of Figures 1 and 2 except that the ring is inverted, its horizontal edge lying next to the bath while its inclined edge is uppermost. In this case, if the temperature of the glass bath is substantially uniform around the draw and the atmosphere is hotter on the tank side, the wedge shape of the ring will increase the cooling effect on the rising wall of the cylinder on the tank side and thus counteract the higher temperature of the atmosphere on that side.

In Figures 4 and 5, I show another form of ring 2ᵇ in which the ring is non-annular or non-circular and may be of general elliptical form. With this form of ring, the ring is suspended over the bath in such a way that its cool wall is nearer the rising cylinder on the tank side than it is on the outside, thus giving a stronger cooling action on the hotter side.

The cooling water is preferably fed into that side of the ring where the stronger cooling effect is desired, since the water will be raised in temperature as it flows through the ring to the outlet. This feature, however, may or may not be employed.

In Figure 6 I show another form of ring 2ᶜ made in semi-circular parts hinged together at 10. In this case the inlet and outlet pipes 3ᶜ and 4ᶜ may be supplied for each half. In the use of this form it may be open somewhat at one side and turned around the cylinder thus varying the cooling effect and shifting this effect as desired.

Other forms of cooling device may be made without departing from my invention and, in fact, an ordinary circular ring may be adjusted so as to bring its wall nearer the cylinder on one side than on the other and thus adjust the cooling effect in accordance with the temperatures, under my broad invention.

I claim:

1. In the method of drawing glass cylinders from a molten bath of glass, the steps consisting in cooling the glass, and adjusting the cooling effect around the cylinder by adjusting the position of the cooler relative to the cylinder being drawn, substantially as described.

2. In the method of drawing glass cylinders from a molten bath of glass, the steps consisting in cooling the glass by radiation, and adjusting the cooling effect around the cylinder by adjusting the position of the adjacent surfaces of the cooler relative to the cylinder being drawn, substantially as described.

3. In the method of drawing glass cylinders from a molten bath of glass, the steps consisting in cooling around the entire circumference of the cylinder, and adjusting the position of the cooler relative to the cylinder being drawn, substantially as described.

4. In the method of drawing glass cylinders with an apparatus having a cooler and a drawing ring, the steps consisting in maintaining the cooler out of contact with the drawing ring, and adjusting the cooling effect by adjusting the position of the cooler relative to the cylinder being drawn, substantially as described.

5. In the method of drawing glass cylinders with an apparatus having a cooler adapted to surround the entire circumference of the cylinder and a drawing ring, the steps consisting in maintaining the cooler out of contact with the drawing ring, and adjusting the cooling effect around the cylinder by adjusting the position of the cooler relative to the cylinder being drawn, substantially as described.

6. In the method of drawing glass cylinders with an apparatus having a drawing ring and a cooler adapted to surround the entire circumference of the cylinder and also adapted to exert a stronger cooling influence on one side of the cylinder than the other, the steps consisting in maintaining such cooler out of contact with the drawing ring and altering the relative cooling effect on opposite sides of the cylinder by adjusting the position of the cooler relative to the cylinder being drawn, substantially as described.

7. In the method of drawing glass cylinders from a forehearth with apparatus having a cooler adapted to exert a stronger cooling influence on the tank side of the cylinder than on the breast wall side thereof, the step consisting in varying the relative cooling effect on the tank side and the breast wall side by adjusting the position of the cooler relative to the cylinder being drawn, substantially as described.

In testimony whereof I have hereunto set my hand.

HENRY F. CLARK.